United States Patent

[11] 3,551,660

[72] Inventors Gerhard Rethmeier
4811 Oldentrup. Nr. 116;
Horst Herger, Flurstr 31, 48 Bielefeld, Germany

[21] Appl. No. 621,724
[22] Filed Mar. 1, 1967
[45] Patented Dec. 29, 1970
[32] Priority Mar. 3, 1966
[33] Germany
[31] No. A51731

[54] ELECTROMECHANICAL APPARATUS FOR CONVERTING CODED INTO DECODED DIGITAL VALUES
2 Claims, 6 Drawing Figs.

[52] U.S. Cl. ........................................................ 235/155, 235/92, 235/146, 340/347
[51] Int. Cl. ........................................................ H04l 3/00, G06f 5/02, H03k 13/24
[50] Field of Search ........................................... 340/347; 235/61.6, 92, 61.65, 146

[56] References Cited

UNITED STATES PATENTS 3,010,653 11/1961 Canepa ........................ 235/61.6(5)X

*Primary Examiner*—Maynard R. Wilbur
*Assistant Examiner*—Michael K. Wolensky
*Attorneys*—Curt M. Avery, Arthur E. Wilfond, Herbert L. Lerner and Daniel J. Tick

ABSTRACT: An electromagnetical code converter for use between a decimal-system business machine and a binary-system electronic computer, each decimal digit being represented by a multibit coded binary number. Displaceable structures for the respective bits of the binary number are shifted under control by respective magnets. The resulting group combination of settings of these structures corresponds to the value of the decimal digit. At least one of the magnets is controlled in response to mechanical operation of the business machine. The other magnets are controlled by signals from the electronic computer.

ELECTROMECHANICAL APPARATUS FOR CONVERTING CODED INTO DECODED DIGITAL VALUES

Our invention relates to electromechanical apparatus for converting coded digital values into straight digital values, such as for translating into ordinary decimal numbers the results calculated in an electronic computer and available therefrom in binary-coded decimal form, representing each individual digit value of the decimal number by a multiple-bit binary number. The code converting apparatus enters such a coded result into a mechanical accounting machine or other machinery requiring the entry of values in straight decimal form.

In a more particular aspect, our invention is an improvement of electromechanical code converters of the general type known from U.S. Pat. No. 3,268,888 of H. Priebs, assigned to the assignee of the present invention. The apparatus according to the patent is based upon a system in which each digit of the decimal number supplied from the electronic computer is represented by a four-bit binary number (tetrad). Assigned to each of the four digit positions of the tetrad is an electromagnet acting upon a displaceable control member. The available displacement combinations of the four control members of the tetrad form a maximum of 16 different measuring paths or lengths proportional to the amount of travel to be performed for the particular decimal digit value to be read out by a feeler structure which controls the transfer of the thus coded digit value from the converter into the decimal-operation mechanisms of the accounting machine or other machinery.

While code converters of this known type are well suitable for operation with the four-bit binary code in which four parallel bit positions are provided per decade of the decoded number, difficulties are encountered with such converters if a code with more than four bit positions per decade is to be employed. This is because the travel range of the structural control members that determine the measuring paths is limited for constructional reasons. This is particularly disadvantageous if relatively large measuring paths are required for the operation of the mechanical feeler members of the accounting or other business machine which is to receive the decoded decimal values. For that reason, the hook-shaped control members, which must perform a longitudinal as well as a pivotal motion, have been given a correspondingly great length in order to keep the pivotal travel sufficiently small so that suitable measuring distances become available for the usually straight travel of the feeler members. Then, however, the code converter occupies undesirably much space in the direction of the magnet armature axes, and the armatures of the four tetrad magnets as well as the control members connected with these armatures must travel undesirably long distances.

It is an object of our invention to improve a code converter of the type known from the above-mentioned patent and to greatly increase the field of applicability of this type converter.

Another object of the invention is to devise a code converter of small overall height operating with rectilinear measuring paths; and it is a further object to make such an improved code converter applicable for a virtually unlimited number of different code systems.

To achieve these objects and in accordance with our invention, we provide an electromagnetic code converter for converting coded values into decimal values, in which electromagnets are assigned to the respective digital positions of each coded value, these magnets controlling the travel of structural members whose displacements conjointly determine a measuring path in such a manner that the length of the measuring path at a time is proportional to a machine-element travel indicative of the decimal value of the decoded digit position. While relative to the features so far mentioned, an apparatus according to our invention corresponds to features of converters known from the above-mentioned patent, it is essential to, and distinctive of, the present invention that some of the magnets assigned to the individual digit positions of the coded value are controlled by the control means of the accounting machine or other machinery operating in accordance with a straight-decimal system, whereas the other magnets, assigned to the same individual digit position of the coded value, are controlled by control means of the electronic computer which supplies the coded values to the converting apparatus.

To minimize the power required for the operation of the individual magnets, and in accordance with another feature of our invention, spring-loaded control sliders resettable by operation of the machine drive area are associated with the respective magnets of each digit position (decade), the sliders having respective control dogs acting upon pawls correlated to the individual decimal or other digit positions. The adjustment of the respective pawls thus effected is scanned off by a corresponding feeler member of the accounting or other machinery. This permits employing magnets of relatively low power rating whose armatures move on short travel distances due to the fact that the sliders are pretensioned by springs and are transferred by machine power to their inactive positions.

According to a further feature of the invention, the magnets appertaining to a decade, inclusive of the appertaining sliders and arresting pawls, are mounted on a common carrier structure and are fixedly interwired with a multiple electric plug which is fastened on the same carrier, so that the components correlated to one of the respective digit positions of the coded value are combined on the carrier structure to a single exchangeable modular unit.

The above-mentioned and further objects, advantages and features of our invention, said features being set forth with particularity in the claims annexed hereto, will be apparent from and will be mentioned in the following with reference to an embodiment of an electromechanical code converting apparatus according to the invention illustrated by way of example in the accompanying drawings, in which:

code applicable in the illustrated embodiment.

Figure 6:
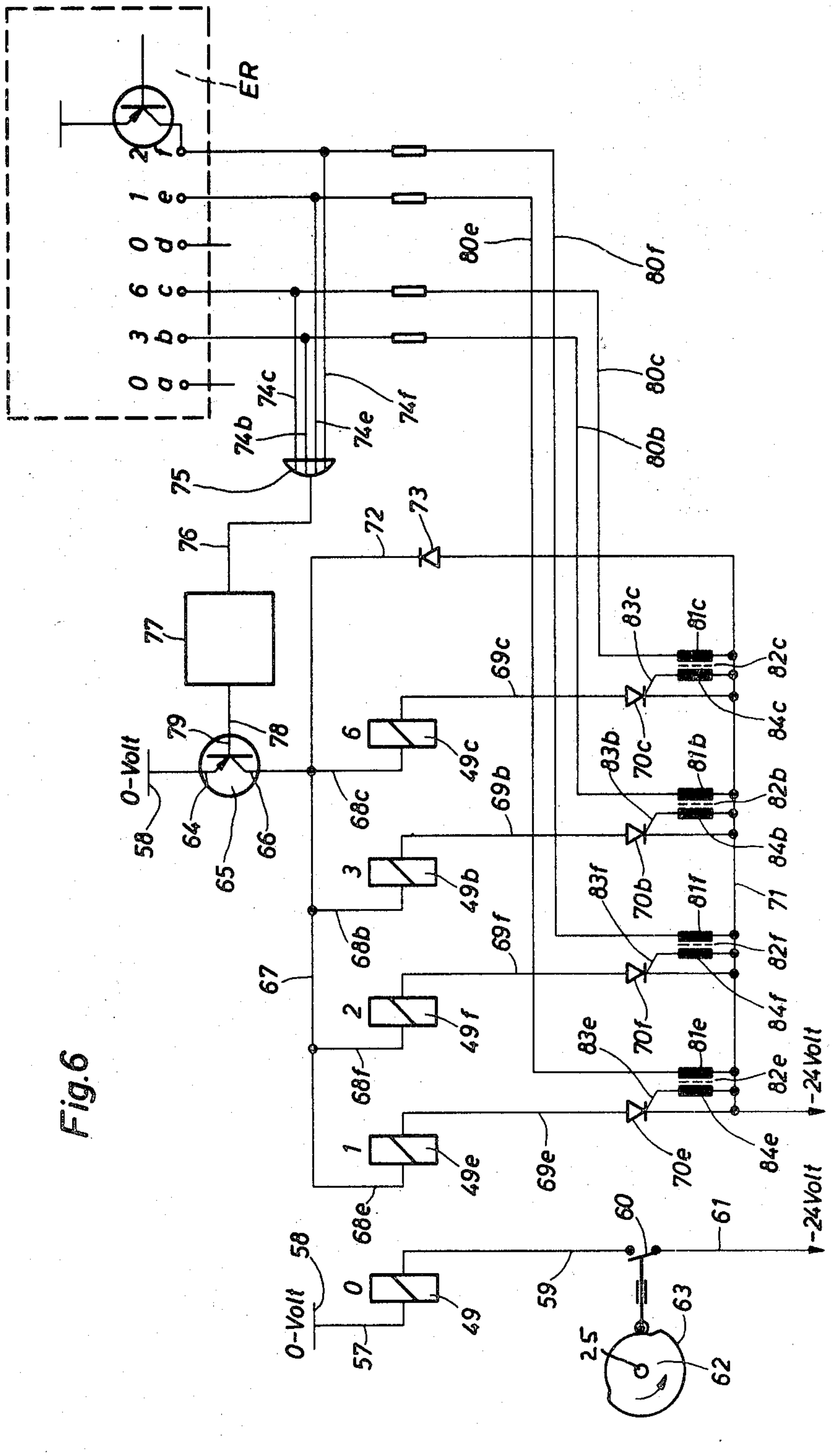

FIG. 6 is a circuit diagram of the code converter incorporated in the embodiment of FIGS. 1 to 4.

Figure 1:
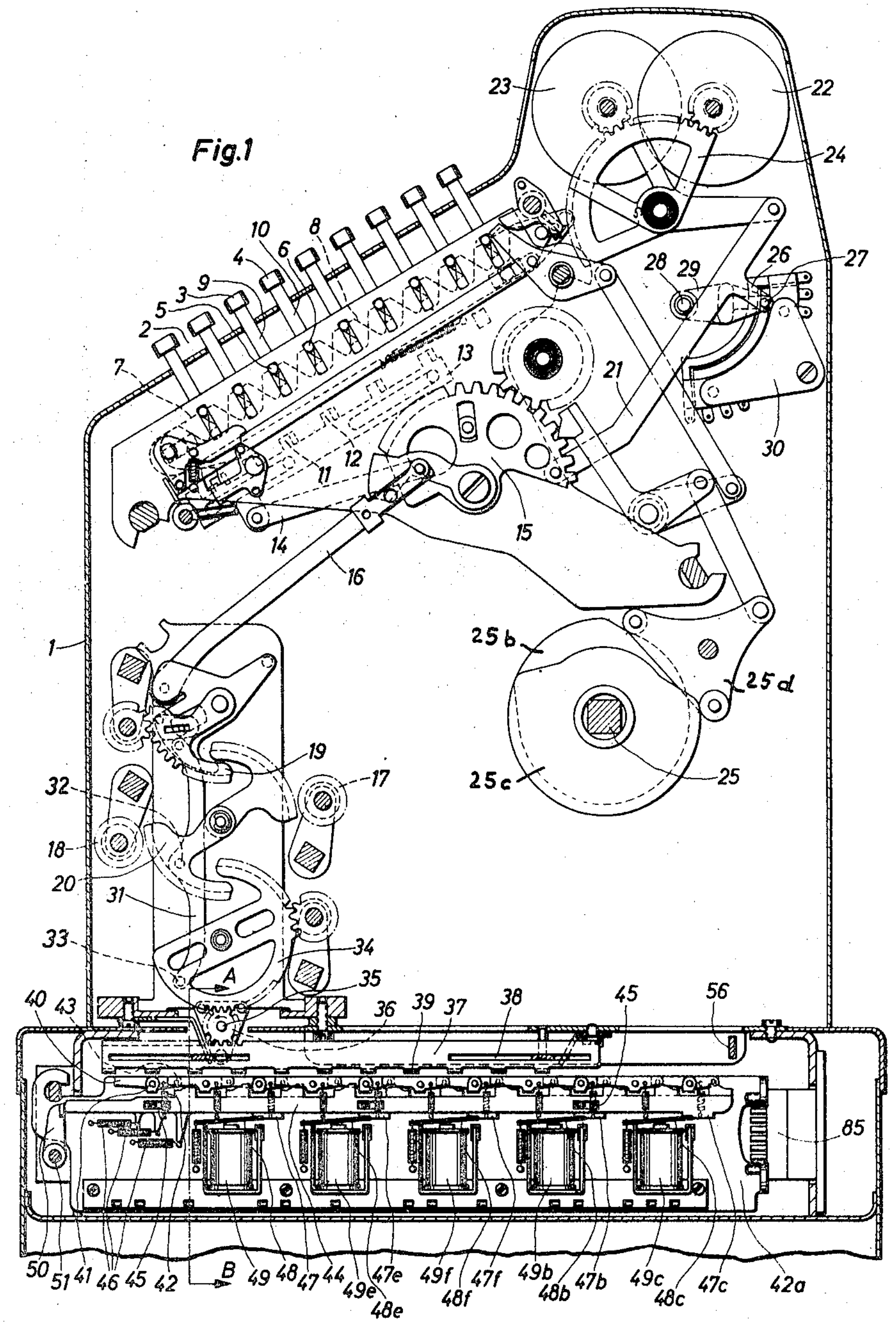
FIG. 1 is a vertical section through an accounting machine taken at the locality of an amount key bank.
Figure 2:
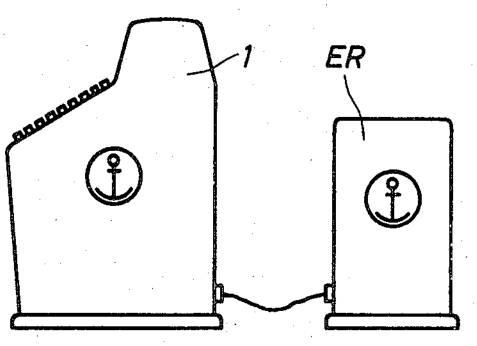
FIG. 2 shows schematically a lateral view of the same accounting machine connected electrically with an electronic computer.
Figure 3:
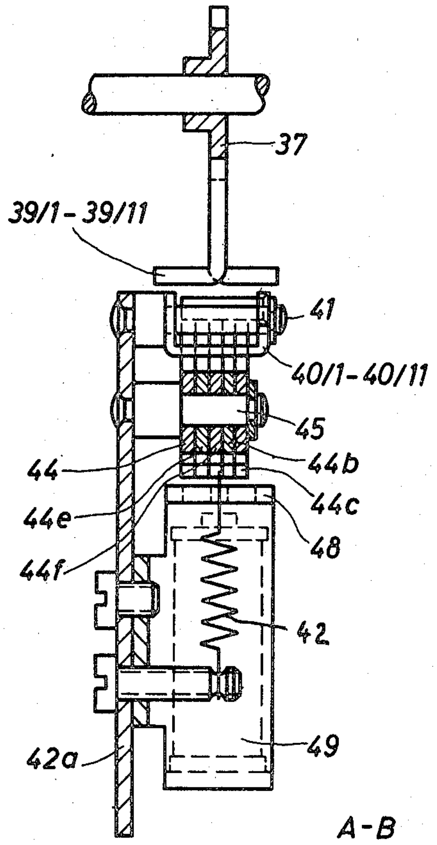
FIG. 3 is a section through part of the accounting machine along the line A–B in FIG. 1.

The accounting machine 1 shown in FIG. 1 has a conventional keyboard with a bank 2 of amount keys whose individual keys 3, 4 have respective cross pins 5, 6 to act upon a stop slider 7 and a control slider 8. When one of the keys of the bank is depressed, its shank 9 or 10 acts upon one of respective stop dogs 11, 12 of a control slider 13 which is in driving connection by a link 14 with the one differential mechanism 15 that appertains to the particular bank of keys illustrated. A link !6 connects the differential mechanism 15 to gear segments 19, 20 which set the calculating mechanisms 17, 18 of the machine. Another link 21 connects the same differential mechanism with a gear segment 24 which drives the indicator drums 22 and 23 of the machine, these drums exhibiting the entered amount through respective openings at the front and rear of the machine housing. The differential mechanism 15 is driven through a slip clutch (not shown) from cams fastened on the machine main shaft 25 and acting upon suitable cam followers (not illustrated). For details of the differential mechanism and its link-up with the main shaft, as well as to details of the key bank sliders and calculating mechanisms, reference may be had to U.S. Pat. No. 3,301,478

(Ser. No. 395,126, filed Sept. 9, 1964, G. Becker, allowed Sept. 26, 1966.)

The link 21 has a lateral extension 26 with a traverse pin 27 which engages the contact arm 29 seated on a shaft 28. The contact arm forms part of a selector switch 30 which serves to electrically transfer to an electronic computer ER (FIG. 2) the values scanned from the amount keys 3, 4 or the calculating mechanisms 17, 18. It will be understood that the illustrated counting machine, aside from being equipped with the key bank 2 and associated components for a decade of decimal numbers to be posted into the machine, is equipped with further amount key banks for the other decades, as well as with one or more control key banks by means of which the particular machine operations to be performed are controlled. Such devices are known as such from the above-mentioned U.S. Patent.

Pivotally joined with the above-mentioned gear segment 19 (FIG. 1) is a linking rod 31 which carries pins 32 and 33 driving respective gear segments 20 and 34. Gear segment 34 meshes with a pinion journaled on a shaft 35 and cooperating with a rack 37 designed as a feeler member and guided in a pin-and-slot guide for linear displacement. The rack 37 (FIGS. 1, 3) is provided with stops 39/1 to 39/11 consisting of respective lugs bent about 90° in alternately opposed directions away from the main structure of the rack. The lateral lugs cooperate with a row of stop pawls 40/1 to 40/11 rotatably seated on respective pivot pins 41 which are fastened to a mounting plate **42*a*. Respective pull springs 42 (FIGS. 1, 3) bias the stop pawls 40/1 to 40/11 clockwise (FIG. 1**) toward the active stop positions.

Figure 4:
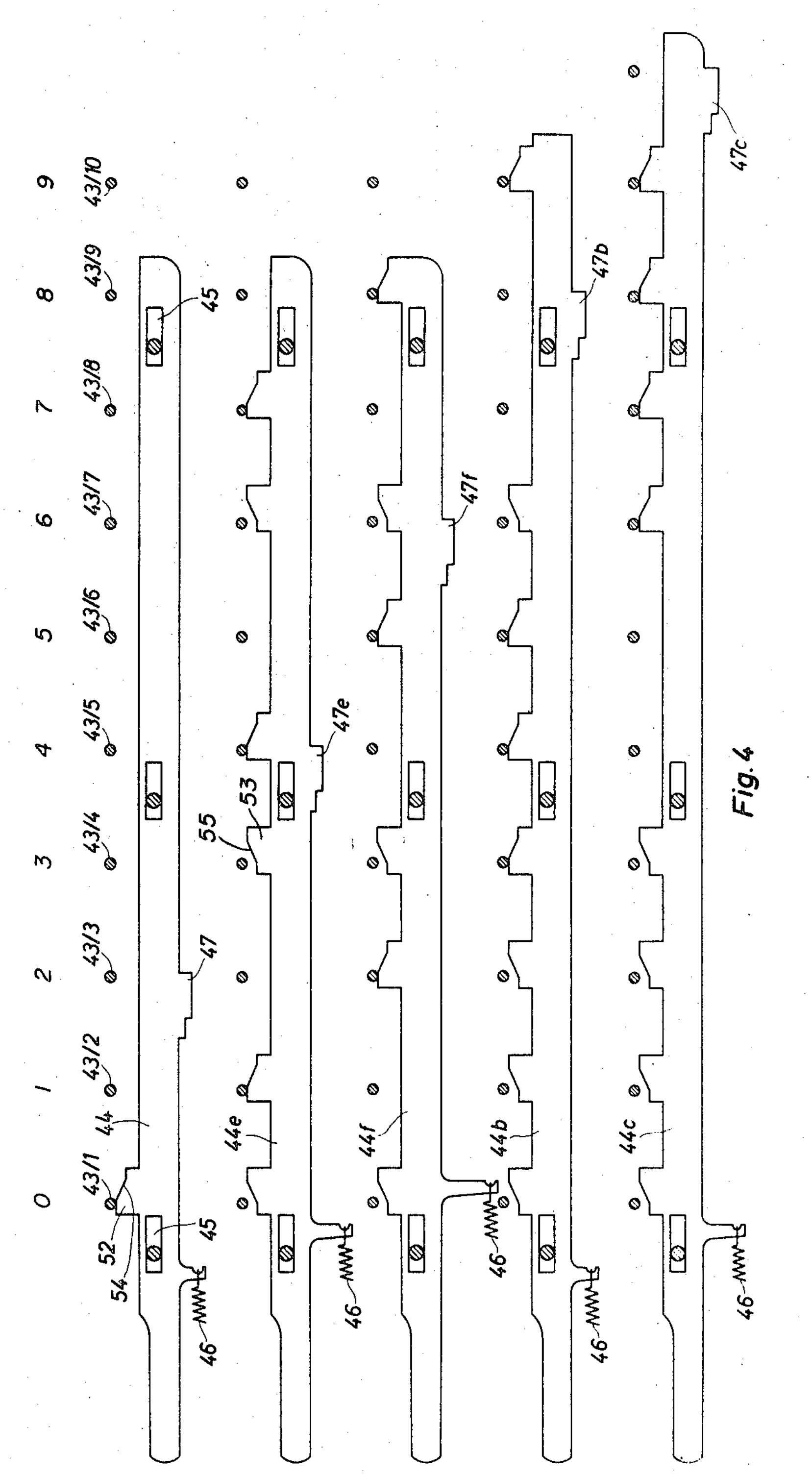
FIG. 4 shows separately a lateral view of five control sliders assigned to respective code converter magnets in the machine illustrated in FIGS. 1 and 3.

Attached to the arms of the pawls 40/1 to 40/11 are respective control pins 43/1 to 43/11 (FIGS. 1, 4) of which each can coact with five parallel sliders 44, **44*b*, 44*c*, 44*e*, 44*f* guided in pin-and-slot connections 45. Each slider is subjected to the pulling force of a spring 46 (FIG. 4) whose other end is secured to the above-mentioned mounting plate 42*a* (FIG. 1). Each of the sliders 44, 44*b*, 44*c*, 44*e*, 44*f* forms a stop 47, 47*b*, 47*c*, 47*e* or 47*f* which coacts with the corresponding armature 48, 48*b*, 48*c*, 48*e* or 48*f* of the appertaining magnet 49, 49*b*, 49*c*, 49*e*, 49*f*. The sliders 44, 44*b*, 44*c*, 44*e*, 44*f* are further acted upon by a zero reset lever 50 which is fastened on a shaft 51 and driven by a cam (not illustrated) fastened on the machine main shaft 25. By means of the zero reset lever, thus driven, the sliders 44, 44*b*, 44*c*, 44*e*, 44*f* are set to the starting position illustrated in FIG. 1. This occurs shortly before termination of the machine run. The sliders further form stop cams 52, 53 which have respective cam edges 54, 55 of differently directed inclinations and are coordinated to the above-mentioned control pins 43/1 to 43/11 (FIG. 4). As apparent from FIG. 4, each of the control pins 43/1 to 43/11 rests upon the top of a corresponding stop cam 52 of one of the respective sliders 44, 44*b*, 44*c*, 44*e*, 44*f*** when the sliders are set to the starting position.

Figure 5:
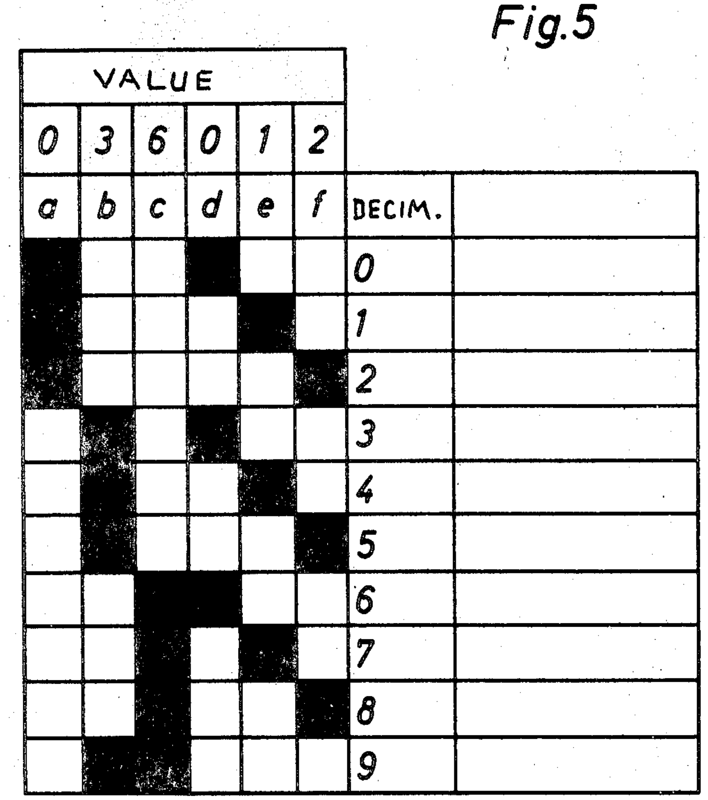
FIG. 5 is an explanatory diagram relating to a $$\binom{6}{2}$$

As will be seen from FIGS. 1 and 6, the illustrated converting apparatus, which in the present embodiment is preferably mounted in the supporting base of the accounting machine, is equipped with a total of five electromagnets 49, **49*b*, 49*c*, 49*e*, 49*f*** which are selectively energized in pairs from a total of six input leads or terminals *a*, *b*, *c*, *d*, *e*, *f*. Each decade or decimal position of a number to be transferred from the accounting machine to the electronic computer (FIG. 2) is converted in accordance with a six-bit binary code, and each computed result to be retransferred from the electronic computer into the mechanisms of the accounting machine is reversely decoded in accordance with the same code. The correlation of the six-bit side to the decimal side of the converter is represented by the diagram shown in FIG. 5. As the six vertical columns in the left-hand portion of FIG. 5 indicate, the numerical values 0, 3, 6, 0, 1, 2 are assigned to the respective six value leads *a*, *b*, *c*, *d*, *e*, *f*. Each two of the six value leads *a* to *f* are coincidently energized for converting a coded digit value into the corresponding decimal position value. It will be recognized that the six-bit binary code permits not only the transmission and coding of the 10 numerical values from 0 to 9, but offers five additional possibilities available for symbols and commands. The $$\binom{6}{2}$$

cod^e^ is also advantageous because it permits detecting transmission errors with the aid of simple supervisory equipment not appertaining to the present invention proper.

Reverting to FIG. 1, it will be seen that a terminal stop 56 fastened to the housing of the machine is located in the path of the rack 34 in order to mark the twelfth stop position. Ten different stops would suffice for transferring the digit values 0 to 9. However, each amount-key bank and each control control-key bank may be given a maximum of twelve different control positions.

Details concerning the control of the magnets 49, **49*b*, 49*c*, 49*e*, 49*f* fastened on the plate 42*a* are apparent from FIG. 6**. The zero-value terminals *a* and *d* of the electronic computer ER (FIGS. 2, 6) are not in conductive connection with a magnet, in contrast to the computer terminals *b*, *c*, *e*, *f* of which each is connected with a different one of the magnets. The magnet 49 is assigned to the zero value. It is connected between a zero-potential bus 58 (or ground) and a current source having a voltage of −24 volt. The connection includes conductors 57, 59, 61 and a switch 60 controlled by a cam disc 62 which is synchronously driven from the machine main shaft 25 (FIGS. 6, 1). Switch 60 is closed by the lobe 63 of cam 62 at the beginning of the value retransfer operation. The zero-voltage bus 58 is connected to the emitter 64 of a switching transistor 65 whose collector 66 is in connection with a manifold line 67 which has branches **68*b*, 68*c*, 68*e*, 68*f* connected with the respective magnets 49*b*, 49*c*, 49*e*, 49*f*. The respective other coil ends of these magnets are connected by respective leads 69*b*, 69*c*, 69*e*, 69*f* through thyristors 70*b*, 70*c*, 70*e*, 70*f* to the −24 volt bus 71. Another branch 72 of the a manifold line 67 extends to a diode 73 whose other pole is connected with the bus 71. This diode forms part of a thyristor shut-off circuit. Branch leads 74*b*, 74*c*, 74*e*, 74*f*** extend from the respective computer terminals *b*, *c*, *e*, *f* to respective inputs of an OR-gate 75. The output of gate 75 is connected to a monostable multivibrator 77 whose output 78 is connected with the base 79 of the switching transistor 65.

The terminals *b*, *c*, *e*, *f* are further connected through leads **80*b*, 80*c*, 80*e*, 80*f* with the primary windings 81*b*, 81*c*, 81*e*, 81*f* of respective pulse transformers 82*b*, 82*c*, 82*e*, 82*f*. The primary windings and the appertaining secondary windings 84*b*, 84*c*, 84*e*, 84*f* have one terminal connected to the −24 volt bus 71. The other ends of the secondary windings are connected to the grid or gate electrode leads 83*b* to 83*f* of respective thyristors 70*b*, 70*c*, 70*e*, 70*t***.

The magnets 49, **49*b*, 49*c*, 49*e*, 49*f* are wired to a multiple-plug coupling 85 fastened to the mounting plate 42*a* of the magnets. The plate 42*a* is slidably seated in the base of the machine housing and normally latched in the proper position. Thus the plate 42*a* and, as a result, the magnets, the sliders 44 and the stop pawls 40** form a subassembly which can readily be removed and exchanged.

The operation of the above-described embodiment of the invention is as follows.

The numerical values or control commands and symbols scanned by the action of the differential mechanism 15 off the amount or control keys 3, 4 or one of the calculating mechanisms 17, 18 are transferred into the rotary selectors 30 (FIG. 1) coordinated to the individual decimal positions (decades). From the selectors 30 (FIG. 1) these values are read-out sequentially (series operation) by the electronic computer ER in known manner and are then processed in the computer. The computation results are intermediately stored, likewise in conventional manner, and are retransferred in parallel relation back into the accounting machine, so that the selected magnets **49*b*, 49 49*c*, 49*e*, 49*f* in each of the decades are simultaneously set. For example, if in the circuitry according to FIG. 6 the value "2" is to be transferred for a decade, then the magnet 49 is energized by closing of the switch 60 at the beginning of the machine run, as already described. Simultaneously, the thyristor 70*f* is turned on by current through lead 80*f* and pulse transformer 82*f*. Thus, the magnet 49*f*** is energized.

If one compares, in FIG. 1, the corresponding sliders 44 and **44*f*, it will be seen that when magnet 49 attracts its armature, the slider 44 will cause its control pin 43/1 to release the stop pawl 40/1 which then turns clockwise to the active position due to the pull of spring 42. However, since simultaneously the slider 44*f* is released in the analogous manner, the stop cam 52 of slider 44*f* returns the control pin 43/1 and consequently the pawl 40/1 to the starting position and releases the control pin 43/3. This causes the stop pawl 40/3 to be turned to its active position. Consequently, when the rack 37 commences travelling, it will be stopped in the position "2." This value, depending upon the requirements, is transferred into the corresponding counting gear of one of the calculating mechanisms 17, 18** and into the printing mechanism, as well as into the indicating mechanism.

When, for example, the value "9" is transferred, the sliders 44, **44*b*, and 44*c* are released. If one compares the pins 43 in FIG. 4, it will be recognized that only the control pin 43/10 is released. This pin represents the digit value "9" since the pint 33/1 is returned to the starting position by the stop cams 52 of the sliders 44*b* and 44*c***.

In the embodiment here selected for illustration, a rack 37 with eleven stops 39/1 to 39/11 is preferred for reasons of construction. If desired, however, a rack with only one or two stops 39 may be used, in which case the magnets 49 and **49*a* to 49*e* can be placed more closely beside each other or may be arranged in a double row. The coordinated stop pawls 40 with sliders 44** must then be correspondingly adapted so that the overall dimensions of the converting apparatus are correspondingly reduced.

While in the foregoing, the converting apparatus is described with reference to the $\binom{6}{2}$ code, the invention is applicable for any other codes suitable to transmit alpha-numerical bits as well as symbols or commands.

We claim:

1. In combination with a business machine, electromechanical apparatus for code conversion between decimal digit values for the business machine and coded multibit binary values for an electronic computer, comprising a displaceable structure for each of the respective digit positions of the coded multibit binary value mounted for displacement travel, output means for providing displacement travel of said respective structures to jointly define a mechanical arrangement corresponding to the decimal digit value, said travel providing means comprising a control magnet for each of said respective structures, said magnets forming a single magnet and a group of magnets electrically, input means including two groups of electric circuits connected to said magnet and said groups of magnets respectively and separately controllable for selectively energizing the magnet and the magnets of the group, one of said circuit groups containing circuit control means adapted for connection to the business machine whereby said magnet is energized in dependence upon business machine operation, said other circuit group having means for connection to the electronic computer whereby the magnets of said group are selectively energized under control by the computer, the apparatus being mechanically attached to said machine, and said machine having drive means in actuating connection with said circuit control means of said one circuit group, said apparatus further comprising control sliders (44, **44*b* to 44*f*) coordinated to said respective magnets and displaceable under control by said magnets, said sliders having respective control cam members (52, 53), a row of stop pawls (40/1 to 40/11) assigned to the individual decimal positions, said pawls being engageable by said cam members so as to selectively deflect from normally inactive to active stop positions due to displacement of said sliders, and said machine having a feeler member (37**) movable along said row of pawls for response to a deflected pawl.

2. The combination according to claim 1, comprising an exchangeably mounted carrier structure, said magnets and said sliders and pawls being all fastened on said carrier, and an electric multiplug coupling also fastened on said carrier and wired to said magnets.